Jan. 19, 1937. A. D. HARRISON 2,068,130
SELF REGULATING FLUID PRESSURE VALVE
Filed Jan. 13, 1934

INVENTOR: A.D.Harrison
BY: E.J.Fetherstonhaugh
ATTORNEY.

Patented Jan. 19, 1937

2,068,130

UNITED STATES PATENT OFFICE 2,068,130

SELF REGULATING FLUID PRESSURE VALVE

Albert Dex Harrison, Hampstead, Quebec, Canada

Application January 13, 1934, Serial No. 706,504
In Canada January 14, 1933

4 Claims. (Cl. 303—54)

The invention relates to a self regulating fluid pressure valve, as described in the present specification and illustrated in the accompanying drawing that forms part of the same.

The invention consists essentially in the automatic readjustments and the maintenance of pressures in the brake cylinder as pointed out in the claims for novelty following a description in detail of the various parts concerned in this invention.

The objects of the invention are to adapt the piston type of valve in the control of the air flow to the brake cylinder and in the exhaust therefrom to economize in the consumption of air and utilize the air consumed to the fullest extent of its force in applying the shoes; to automatically close the valve when and by reason of the air pressure desired in the brake cylinder, thereby economizing in the use of air as aforesaid; to facilitate the application of the brakes and at the same time operate the parts with exactitude and thereby eliminate to a great extent the mistakes of a poor operator and the bad results of flat wheels; to effect the emergency application without undue loss of air and coincidently effect the sanding of the rails in tramcars and other railway vehicles and to segregate the valves in this emergency application, thus avoiding the use of the emergency brake without just cause; to afford accessibility to all the parts of the mechanism and to do away with gaskets or other material, and generally to provide a durable, efficient and economical self regulating fluid pressure valve.

In the drawing, Figure 1 is an elevational view of the mechanism broken away to disclose a section of the manual operating lever and its connections.

Like numerals of reference indicate corresponding parts in the various figures.

Figure 1:
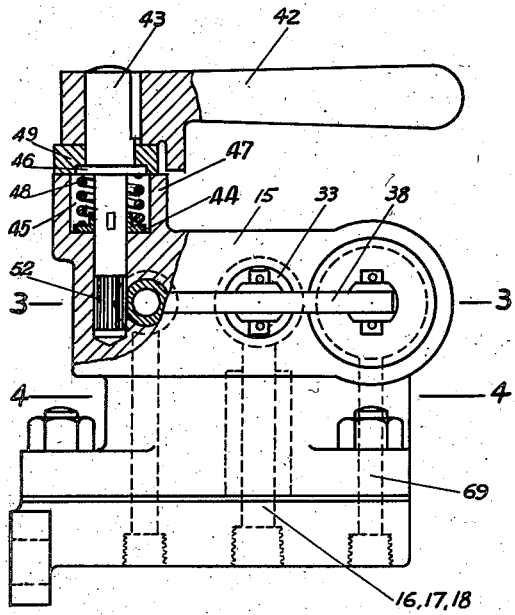
Figure 2:
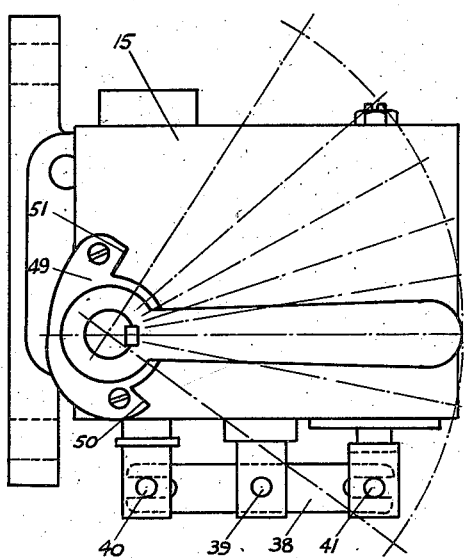
Figure 2 is a plan view of the device.
Figure 3:
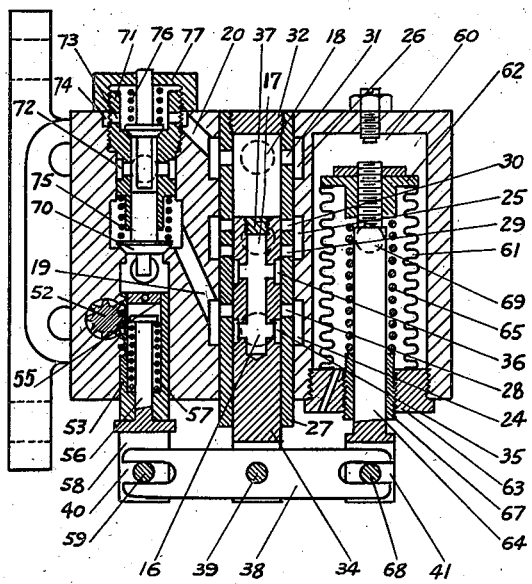
Figure 3 is a cross sectional view on the line 3—3 in Figure 1.
Figure 4:
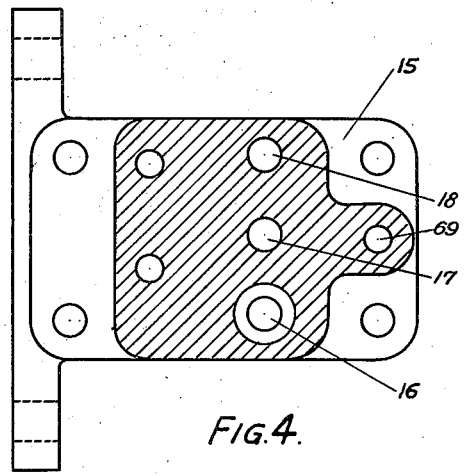
Figure 4 is a cross sectional view on the line 4—4 in Figure 1.

Referring to the drawing, the numeral 15 indicates a valve mechanism body in the form of a block having the passage 16 connected to the reservoir of compressed air, the passage 17 used in the service application or release of the brakes, the passage 18 for the exhaust of the air, the passage 19 for blowing in sanding operations and the passage 20 used in emergency applications.

The passages 16, 17, and 18 extend upwardly to the annular cross channels 24, 25, and 26.

The valve chamber 27 in parallel form having the ports 28, 29, 30, and 31 and closed at the end by the screw plug 32, is introduced in a bore 33 through the block 15, this bore being concentric with the cross channels 24, 25, and 26 and of lesser diameter thereby completing the annular channels or chambers encircling the valve chamber 28 and communicating therewith through said ports in the manner hereinafter described.

The valve 34 operates in the valve chamber 27 and is formed with the annular ports 35 and 36 registering with various ports in the valve chamber 27 as explained in following the course of the air in the several operations, this valve being closed at one end by the screw plug 37.

This valve 34 extends beyond the chamber 27, which in turn extends beyond the block.

The floating lever 38 is pivotally connected to the valve at 39 and this floating lever is slotted inwardly from either end at 40 and 41 respectively.

The operating handle 42 is fixedly mounted on the spindle 43 and this spindle is journalled in the bearing 44 set in the recess 45 and spring-held by the flange 46 at the lower end of the head 47 of the spindle by the spring 48, the cap 49 forming the stops 50 and 51 closing in said flange in said recess.

The spindle 43 is reduced from the flange downwardly and its lower end forms the pinion 52 coacting with the rack 53.

The rack 53 slides in the passage 54 parallel with the valve in the valve chamber 27, and this rack forms a socket 55 for the headed pin 56, spring-held by the spring 57 in said socket and carrying at its outer end the flanged head 58 to which the pivot 59 is rigidly secured, this pivot extending upwardly through the slot 40 of the floating lever 38, thus any movement of the handle in the operation of the brakes is immediately communicated to the lever 38 through the rack 53 and resiliently mounted head 58.

The equalizing chamber 60 is also parallel to the valve chamber 27 on the other side and the bellows form of diaphragm 61 operates in said equalizing chamber 60, the heads 62 and 63 of this diaphragm being mounted on the spindle 64, these heads being maintained apart by the spring 65 encircling the said spindle.

The head 62 is fixed on said spindle but held in a flexible position subject to the air pressure by the bellows 61 connecting it to the head 63.

The head 63 is externally threaded and screwed into the wall of the equalizing chamber 60 and internally threaded and screwed on to the slidable sleeve 67 mounted on said spindle.

The outer end of this spindle 64 carries a pivot pin 68 which extends upwardly from the slot 41 and forms an adjustable fulcrum dependent for its position on the pressure which is connected to the brake cylinder through the passage 69 and to the service passage 17 fed from the reservoir passage 16 through the movement of the valve 34 all these depending on the operation of the floating lever 38.

It will be noticed that to perform the sanding operation, that is to blow sand on the tracks, the air is fed through the passage 19 and to make the necessary communications the valve 70 must be operated.

This valve 70 is contained in the valve chamber 71, which is screwed into the cavity 72 in the block and communicating with the recess 55.

The port 73 in the wall of the chamber 71 communicates with the annular channel 74, this in turn communicating with the emergency passage 20.

The spring 75 encircles the valve 70 and presses against its head from the valve chamber casing 71, while the spring 76 is contained within the cap 77 closing the opening to the cavity 72 and engaging the flange 78 surrounding the valve 70 and fixedly mounted thereon.

The inner end of this valve 70 projects into the socket 55 and is there engaged by the inner end of the rack 53, the preliminary operation in rotating the handle in that direction being the sanding of the tracks through the flow of air through the passage 19 while the next operation to accomplish the application of the service brakes is the further moving of the handle in the same direction, which connects the passage 20 with the port 73 through the valve chamber wall and connecting with the annular chamber 74.

In the operation of the invention, the first step is to turn the handle for the purpose of applying the brakes. This turning of the handle is done comparatively slowly and over a radius marked off by graduations.

The movement along the path of the graduations is continuous until the handle reaches well on to the end of the path, possibly about three quarters, and this is what they call the service application.

The result of this movement is the operation of the pinion on the stem of the handle, which coacts with the rack and this rack in turn draws the floating lever.

The floating lever is temporarily fulcrumed on the pivot at the outer end of the diaphragm spindle, and intermediately of this floating lever, the pivot at the end of the valve stem is engaged by the floating lever and the valve moved inwardly, and this means that the annular ports surrounding the valve register with the ports in the valve casing and in turn, these ports in the valve casing register with the annular chambers in connection with the reservoir passage 16 and service passage 17 respectively.

The result of this operation is that the air from the service reservoir flows along the passage 16 into the annular chamber and through the port in the valve casing and corresponding annular port into the interior of the valve through the port provided therefor, and this air flows out through a port in the wall of the valve into an annular port therearound and out through a port in the valve casing to the middle annular chamber and from there down through the service passage 17 to the brake cylinder.

The result of this flow if it ended there, would be the application of the brakes, but there is a backflow from the brake cylinder to and through a passage to the diaphragm chamber and this has the effect of compression on the diaphragm, which moves it in opposition to the compression of the spring, which in turn moves the temporary fulcrum hereinbefore mentioned, and consequently closes the valve ports.

The condition now is a service application with the air pressure balanced between the diaphragm chamber, the service passage and the brake cylinder, which remains governed entirely by the portion of the diaphragm, for if there is any leak at all in the brake cylinder, then the movement of the diaphragm will again move the floating lever and a valve and admit fresh air, and during the period this pressure remains the brakes are applied in what is called the service application.

In the beginning of the release operations, the handle is started on the return stroke and moves slowly to or near the midposition and this then governs the flow of the air so that any quick release is avoided, and no jerk occurs, and from this midposition to which it is held, while the brakes are still applied, it is moved for the actual release to the starting point.

It will of course, be understood that while the car is standing this near midposition is the holding position, for the car is then stationary, following the first movement, in other words, to apply the brakes in the first place, the air pressure must be greater than merely for the holding of the car to the stationary position, the final release comes after that.

Meanwhile, the floating lever has assumed its different positions, and likewise the fulcrum pivot has also assumed its different positions. The original fulcrum position of the diaphragm lever is when the diaphragm chamber is free from pressure, then in the service application, the diaphragm spindle through the pressure of air behind the diaphragm moves the diaphragm pivot to its service position, and again the floating lever temporarily fulcrums on this diaphragm pivot when the handle is moved back to the near midposition.

This movement of the handle draws on the valve outwardly through the pivot connection, and the stem of said valve and uncovers the exhaust port which permits the flow of air from the midannular chamber or service pipe or passage and the exhaust air flows through the exhaust passage to the atmosphere.

This means that there is a reduction of air in the brake cylinder, but then there must be the equalizing of the pressure all around and the consequence is that the pressure in the diaphragm chamber reduces, and this means that the diaphragm pivot point engaged by the floating lever, moves inwardly and consequently, the valve moves inwardly and closes the exhaust port and restores the brake application at a lower pressure.

The further movement inwardly of the handle for the actual release of the brakes again moves the pivot of the rack outwardly to the off position, and this again draws the stem of the valve outwardly and consequently, the valve, which uncovers the exhaust port and releases the air from the brake cylinder and the diaphragm chamber, and through the spring pressure the diaphragm spindle and diaphragm pivot, and the result is that the valve is at its outermost position which uncovers the exhaust port permanently and seals both the inlet port from the reservoir and the outlet port from the brake cylinder.

The emergency application of the brakes means a continued movement of the handle beyond the service application position, and as a general rule sanding is first required.

The rack drawing inwardly on the floating lever opens the ports as already described, but continues until at its inner end it engages the stem of the sanding valve.

The opening of this valve means communication with the inlet annular chamber through a cross channel and this air passes through the port customarily closed by the sanding valve and down the sanding passage to the sand box where it blows the sand on the rails.

The inward movement of the rack continues and the stem from the other side of the sanding valve contacts with the stem of the emergency valve which opens a passage to the emergency pipe releasing the air under pressure in said pipe which flows out through the port covered by the emergency valve to the exhaust pipe.

The release of the air pressure from the emergency valve opens an auxiliary valve directly connecting the reservoir to the brake cylinder in quite another mechanism as is known in common practice.

It may be mentioned that the construction of the rack in this invention is a very important feature, especially in the emergency application, for the rack is made in two pieces spring held together so that in the service application, these pieces are practically intact and form one moving part, while to continue the application to the emergency application, the inner part may of itself separate itself from the head and continue to act without actually drawing the head with it, thereby leaving the stem pivot still in a service application position, which maintains the application coincidently and avoids any strain on the service application in regard to high pressure.

What I claim is:—

1. In a self regulating fluid pressure valve, a valve body divided into a valve chamber having an inlet port connected to a source of compressed air, an intermediate port connected to the work and an exhaust port, and a pressure adjusting chamber having an open connection to the work, an actuating member suitably mounted in said valve body, a floating lever external to said valve body and flexibly connected to said actuating member, a hollow valve having inlet and outlet ports communicating with said inlet port and work port of the valve chamber and associated with said floating lever and controlling the flow of air to and from the work, and an adjusting member in said pressure adjusting chamber and having a connection to said floating lever and adapted to return said valve to its neutral position.

2. In a self regulating fluid pressure valve, a valve body divided into a valve chamber having an inlet port connected to a source of compressed air, an intermediate port connected to the work and an exhaust port, and a pressure adjusting chamber having an open connection to the work, an actuating member suitably mounted in said valve body, a floating lever external to said valve body and flexibly connected to said actuating member, a valve in said valve chamber associated with said floating lever and controlling the flow of air to and from the work, and an adjusting member in said pressure adjusting chamber comprising a head closing said chamber, a diaphragm mounted on said head and a rod reciprocating in said head and connected to the inner end of said diaphragm and to said floating lever and adapted through the action of said adjusting member to return said valve to its neutral position.

3. In a self regulating fluid pressure valve, a valve body divided into an operating chamber having valve seats, a valve chamber having an inlet port connected to a source of compressed air, an intermediate port connected to the work and an exhaust port, and a pressure adjusting chamber having an open connection to the work, a sanding valve and an emergency valve in said operating chamber spring held to said seats, an actuating member in said operating chamber reciprocating said valves, a floating lever external to said valve body and flexibly to said actuating member, a valve in said valve chamber associated with said floating lever and controlling the flow of air to and from the work, and an adjusting member in said pressure adjusting chamber and having a connection to said floating lever and adapted to return the valve in said valve chamber to its neutral position.

4. In a self regulating fluid pressure valve, a valve body divided into an operating chamber having a valve seat, a valve chamber having an inlet port connected to a source of compressed air, an intermediate port connected to the work and an exhaust port, and a pressure adjusting chamber having an open connection to the work, a sanding valve and an emergency valve in said operating chamber spring held to said seats, a rack in said operating chamber operable by a pinion reciprocating said valves, a floating lever external to said valve body and flexibly connected to said rack, a valve in said valve chamber associated with said floating lever and controlling the flow of air to and from the work, and an adjusting member in said pressure adjusting chamber and having a connection to said floating lever and adapted to return said valve to its neutral position.

ALBERT DEX HARRISON.